Feb. 16, 1937.  R. B. BENJAMIN  2,071,159
LIGHTING CONSTRUCTION
Original Filed Oct. 1, 1931   2 Sheets-Sheet 2
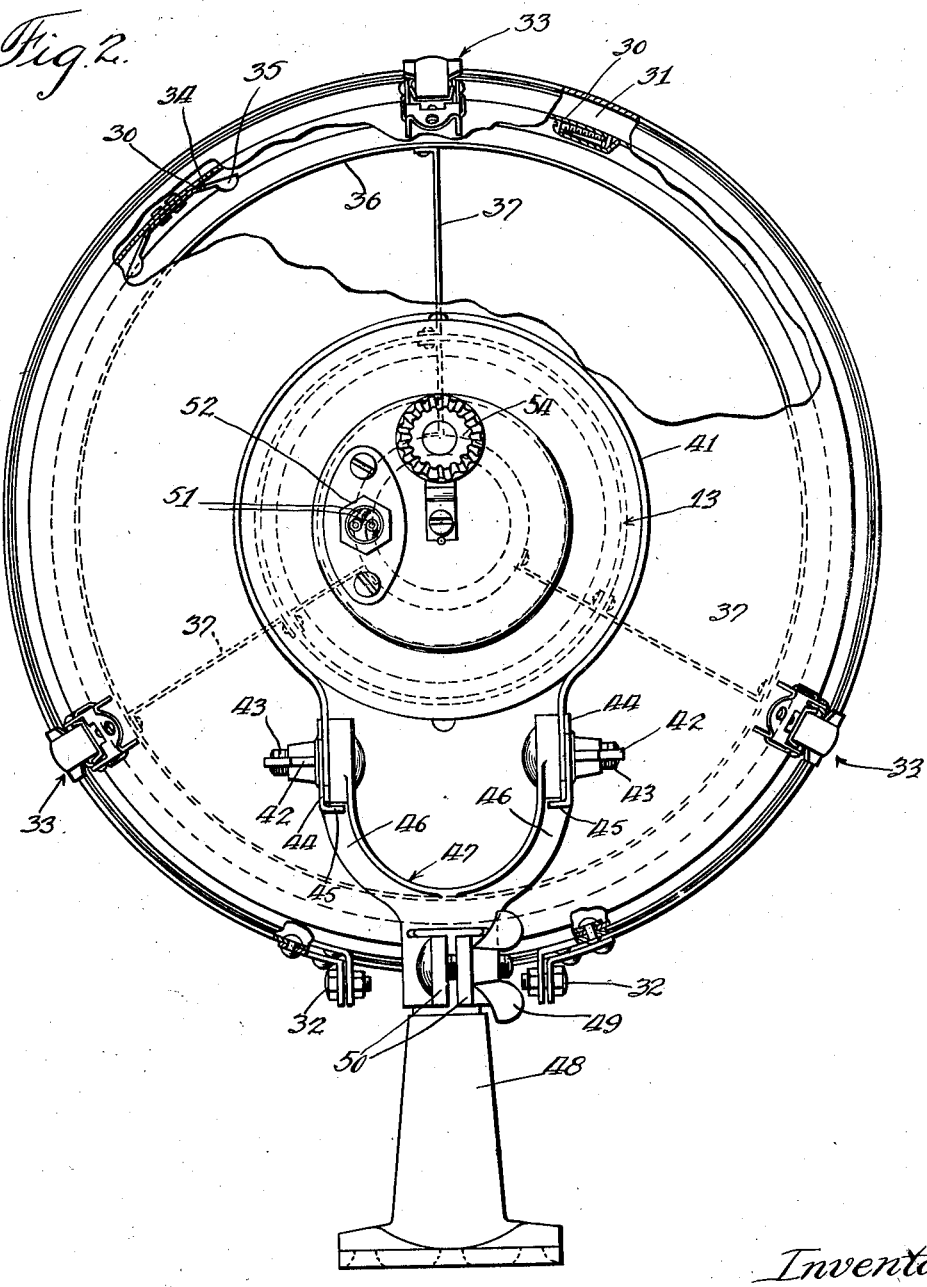

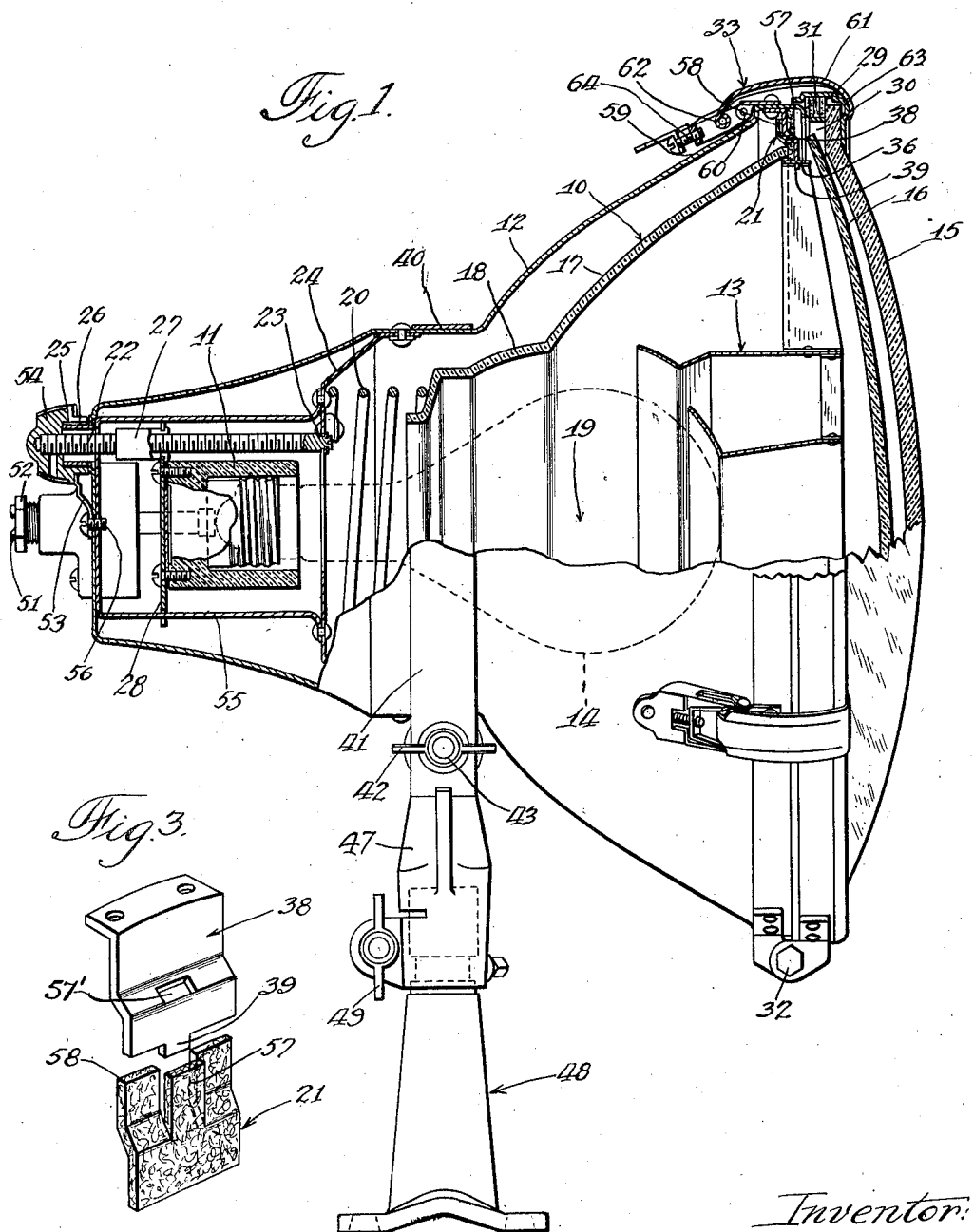

Patented Feb. 16, 1937

2,071,159

UNITED STATES PATENT OFFICE 2,071,159

LIGHTING CONSTRUCTION

Reuben B. Benjamin, Chicago, Ill., assignor to Benjamin Electric Manufacturing Company, Des Plaines, Ill., a corporation of Illinois Application October 1, 1931, Serial No. 566,213
Renewed July 22, 1935

4 Claims. (Cl. 240—41)

My invention relates to a lighting construction and more specifically to a type known as a floodlight. Certain of the features disclosed in this application are disclosed and claimed in my co-pending application Serial No. 436,338, filed March 17, 1930, which eventuated into Patent No. 1,880,399 issued October 4, 1932.

Among the objects of my invention are to provide improved means for attaching the front cover glass to the frame in which it is mounted.

A further object is to provide improved means for mounting the color screens.

Another object is to provide improved means for mounting the louvres.

Another object is to provide improved cushioning spring means for mounting the mirrored glass reflector.

A further object is to provide improved means for mounting the casing to permit swiveling movement to bring the hinge for the cover glass in proper position.

Further objects will be apparent from the description and claims.

In the drawings, in which an embodiment of my invention is shown,

Figure 1 is a side elevation of a floodlight, parts being broken away;

Fig. 2 is a rear view of the floodlight, with parts broken away;

Fig. 3 is a detail perspective view showing the cushioning construction for the glass reflector.

Referring to the drawings in detail, the construction shown comprises a mirrored glass reflector 10 formed as a surface of revolution, a lamp socket 11 in the rear of the glass reflector, a casing 12 comprising a portion surrounding and housing the mirrored glass reflector and a portion surrounding and housing the receptacle, a set of louvres 13 mounted in front of the bulb 14, a glass cover 15 extending across and in front of the reflector, a glass color screen 16 mounted adjacent the glass cover, and means for mounting the casing for limited universal adjustment.

The glass reflector and louvres may be of any desired construction and design to give the desired light distribution and lighting effect. As shown, the mirrored glass reflector comprises a main parabolic portion 17 which directs the rays of light falling thereon outwardly in a general floodlighting manner, and a spherical portion 18 which directs the rays of light falling thereon substantially directly back towards the light source 19 so that these rays will fall on the parabolic portion of the reflector and be directed outwardly to add to the floodlighting effect. The glass mirror is yieldingly held in position by means of a coil compression spring 20 which presses the front edge of the glass reflector against felt cushioning pads 21.

The socket is adjustable back and forth for focusing the light by means of an adjusting screw 22 swiveled at 23 in the supporting bracket 24 and at 25 on the bushing 26, and having threaded engagement with a nut 27 secured to the mounting place 28 of the socket 11.

The glass cover is held in place in its mounting ring 29 by means of an expansible metal band 30 which can be operated to force the felt packing ring 31 outwardly into the channel in the mounting band 29, at the same time forcing the felt packing ring 31 snugly against the rear face of the glass cover 15 to hold it securely in the mounting ring 29.

The mounting ring is hinged to the lower edge of the casing at 32 and may be latched in assembled position by means of the latch construction shown at 33 which is also disclosed and claimed in the application of Paul D. Phillips, Serial No. 547,229, filed June 27, 1931, which eventuated into Patent No. 1,898,742, issued February 21, 1933.

The glass color screen 16 is yieldingly held in position by means of leaf spring clips 34 riveted to the expansible band 30 and having finger portions 35 embracing the edge of the color screen.

The louvres may be secured to a spring mounting ring 36 by means of radially extending straps 37, the spring mounting ring being carried by inwardly extending lugs or brackets 38 riveted to the casing and having tip portions 39 for engaging openings in the spring mounting ring 36.

The casing is provided with a cylindrical portion 40 which is swiveled in a mounting ring 41 so that the casing can be adjusted to bring the hinge 32 of the glass cover to the desired position or to secure the proper direction for the light spread in case the light is designed to give a non-circular or so-called spread distribution. To enable the swiveling adjustment to be made, one or the other of the wing nuts 42 is loosened to slacken the clamping band 41 and again tightened up after the proper adjustment has been made. A tilting adjustment of the light may also be made about the studs 43 on which the wing nuts are threaded. In order to prevent any tendency to tilt from causing the wing nuts to become loosened, a non-rotatable washer member 44 is provided between the end of the clamping band and wing nut, this washer being held against rotation by means of inwardly extending fingers 45 straddling a rib 46 on the Y-shaped supporting bracket 47. This Y-shaped supporting bracket is mounted for swiveling adjustment on the lower bracket 48 and may be held in adjusted position by means of a wing nut 49 which draws together the ears 50 of the split clamping portion of the lower end of the Y-shaped bracket 47. The lower bracket may be mounted in any suitable manner on a supporting member by means of clamping bolts, or the like.

The feed wires 51 for the socket are led into the casing through any suitable weatherproof bushing construction 52. The adjusting screw for the socket is held in adjusted position by means of a spring finger 53 engageable with a circumferentially arranged series of notches on the inner face of the adjusting knob 54.

The lower end of the supporting plate 28 for the socket is guided by means of a U-shaped strap 55 riveted to the supporting bracket 24 and secured to the casing by means of the screw 56 which holds the spring finger 53. Each of the felt pads 21 against which the front edge of the reflector bears is held in place on one of the louvres supporting lugs 38 by means of a central tongue 57 on the pad which is inserted through an opening 57' in the lug so that this central tongue lies on the outer side of the lug and the two side tongues 58 lie against the inside of the lug. The edge of the reflector lies in the angle formed by the side tongues 58 with the main body portion of the pad.

The clamping device, described in detail in the co-pending application, Serial No. 547,229, referred to, comprises an operating lever 59 pivotally mounted at 60 on the casing 12 and a clamping hook member 61 pivoted to the operating lever at 62 and having a hooked or clamping portion engaging the bead 63 on the mounting band for the cover glass. When the mounting band for the cover glass has been swung into position, the hooked portions of the clamps are engaged with the bead 63 on the clamping band and the lever is moved to clamping position to move the pivotal point 62 past the dead center line between the pivot 60 for the lever and the point of the hook. The degree of clamping action may be regulated by means of an adjusting screw 64 which shifts the position of the pivotal connection 62 with respect to the pivotal mounting 60.

It will be seen that the above-described construction provides a durable and efficient means for attaching the front cover glass to the frame in which it is mounted, enables the casing to be swiveled to bring the hinge for the cover glass in the desired position, and provides improved cushioning means for mounting the mirrored glass reflector.

Further modifications will be apparent to those skilled in the art and it is desired, therefore, that my invention be limited only by the prior art and the scope of the appended claims.

Having thus described my invention, what I claim and desire to secure by Letters Patent is:

1. An electric floodlight fixture construction of the character described comprising a casing having a concave reflector portion and a lens cover therefor, a reflector in said casing conforming substantially to the contour of said casing, a rearwardly extending restricted hood portion, a longitudinal adjustable socket in said hood portion for supporting a light source in adjustable relation to said reflector, means accessible from outside said hood portion for adjusting said socket, means for releasably maintaining said socket in adjusted relation, and means between said reflector portion and said hood portion for securing said fixture to a permanent support and arranged to allow axial rotation of said casing or simultaneous axial rotation and tilting in a vertical plane relative to said securing means.

2. An electric floodlight fixture of the character described comprising an elongated casing having an enlarged concave reflector-housing portion, a rearwardly extending restricted cylindrical portion adjacent said concave portion and a rearwardly extending restricted hood portion for a lamp receptacle, a hinged lens cover for said concave portion, a resiliently supported reflector in said concave portion, a socket in said hood portion for supporting a light source in adjustable relation to said reflector, means secured to said cylindrical portion and said hood portion for slidably mounting said receptacle, means accessible from the rear of said hood for adjusting said receptacle on said support, means for releasably maintaining said socket in adjusted relation, and mounting means for said casing comprising a bracket, a yoke in axial swivel relation on said bracket, means for clamping said yoke in fixed relation, a strap around said cylindrical portion and having ends engaging the arms of said yoke in hinged relation and releasable to allow simultaneous tilting of said casing in a vertical plane and rotation of said casing around its longitudinal axis, and means cooperating with said strap and said yoke to prevent loosening of said clamping means.

3. An electric floodlight fixture of the character described comprising an elongated casing having an enlarged concave reflector-housing portion, a rearwardly extending restricted cylindrical portion adjacent said concave portion and a rearwardly extending restricted hood portion for a lamp receptacle, a hinged lens cover for said concave portion, resilient clamping means for clamping said lens cover to said concave portion, a resiliently supported reflector in said concave portion, a resiliently supporting color filter between said lens and said reflector, a socket in said hood portion for supporting a light source in adjustable relation to said reflector, means secured to said cylindrical portion and said hood portion for slidably mounting said receptacle, means accessible from the rear of said hood for adjusting said receptacle on said support, and means for releasably maintaining said socket in adjusted relation.

4. A lighting fixture construction comprising a reflector, a casing, a lamp socket, supporting and guiding means for the lamp socket, and supporting means for said casing, said reflector being bowl-shaped and formed as a surface of revolution coaxial with the lamp socket, said casing having a bowl-shaped portion surrounding the reflector and formed as a surface of revolution coaxial with the socket, and a reduced portion in the rear of the bowl-shaped portion formed as a surface of revolution about the axis of the socket and materially smaller in diameter than the maximum diameter of the bowl-shaped portion and comprising a cylindrical portion, said socket being mounted in the reduced portion of the casing, said supporting means comprising a circular clamping band closely surrounding said cylindrical portion in which band said casing is mounted for swivel adjustment about its axis, said lamp socket supporting and guiding means comprising means in and mounted on the wall of the reduced portion of the casing for supporting and guiding the socket for movement longitudinally of its axis.

REUBEN B. BENJAMIN.